United States Patent Office 2,842,436
Patented July 8, 1958

2,842,436

SELECTIVE REJECTION OF IRON AND ALUMINUM IN HYDROMETALLURGICAL RECOVERY OF METALS

John Orndorff Dasher, Pittsburgh, Pa., and Arthur Jones Beyer, White Plains, N. Y.; said Beyer assignor to the United States of America as represented by the United States Atomic Energy Commission No Drawing. Application January 30, 1956
Serial No. 562,358

6 Claims. (Cl. 75—101)

This invention is concerned with the hydrometallurgical recovery of non-ferrous metals from mixtures thereof with iron and/or aluminum. It is also concerned with solutions of mixed salts of these metals. In particular, it deals with a method of separating such metals, per se or as compounds thereof, from iron and/or aluminum and/or compounds of iron and/or aluminum.

Various hydrometallurgical operations for the recovery of non-ferrous metals, either as metals or as compounds thereof, from industrially-available source materials are the objects of increasing commercial interest. For purposes of this discussion the steps in any such operation may be considered as divided into three classes which may be grouped as follows:

(1) Those used in placing the metals of interest in suitable solution as soluble compounds thereof;

(2) Those used in the separation of the unwanted solutes from the metals of interest; and (3) Those used in the separation, if necessary, of the metals of interest and in their recovery in commercially-useful form.

So far as the present invention is concerned, the source material may be either a solids mixture containing the metal of interest together with iron and/or aluminum, or may be a solution containing compounds of these metals. On this basis, therefore, the present invention may be considered as a development of wide applicability in the first two of these groups.

In the investigation of methods for the hydrometallurgical recovery of non-ferrous metals, particularly chromium, cobalt, copper, lead, manganese, nickel, zinc and the like, certain common features are found in various treating processes. Among these, the heterogeneous nature of the source materials; the occurrence therein of iron and/or aluminum; the difficulties encountered in the separation of the metal or metals of interest from iron and aluminum; and if necessary, the separation from each other of a plurality of metals of interest perhaps introduce the most troublesome problems.

Metals of various degrees of interest which can be processed according to the present invention include among others those which can normally be recovered as elemental metal by gas reduction of solutions and/or slurries containing compounds thereof. This includes all metals having an oxidation-reduction potential between those of silver and cadmium, inclusive, and which also will form a soluble, gas reducible complex with ammonia. Of these metals, as a practical matter, only cadmium, cobalt, copper and nickel are encountered in ordinary practice.

However, the invention is not so limited. It is also of interest in processes for the recovery of metals which are commercially recovered as their oxides or hydroxides, these latter compounds being either saleable as such or easily converted to the corresponding elemental metal by known processes. Any metal which can form an insoluble oxide or hydroxide in a suitable aqueous acidic solution at from about pH two to about pH six can be advantageously treated. Typical of metals of this group are those of the preceding paragraph and in addition, beryllium, chromium, germanium, lead, manganese, thorium, tin, tungsten, uranium, vanadium, zinc, zirconium and the like.

In general, the process of the present invention is simply stated. Any solution of salts of the metals is treated to produce a solution in a suitable acid at a pH of from about two to about six. Resultant precipitate is then separated and releached with initially stronger acid, this releaching being terminated at a pH not greater than about 2.5 and preferably below about one. Leaching liquor at the end of the cycle should be at least 350° F., and preferably at 400° F. or higher. Under these conditions, the metal or metals of interest substantially completely redissolve, usually in more concentrated liquor than the original, but only a small amount of the iron or aluminum is releached. If so desired, these operations may be repeated. Releach liquor is then treated to recover the metal value or metals values.

As mentioned above, the source material may be widely varied. For example, it may be an ammoniacal solution of metal salts or of metal "amine" salts. As sometimes happens, if the solution is sufficiently free of iron and/or aluminum, the present invention is not needed. Often, however, one or both of iron and aluminum will be found in the available solution. If so, the present process is very useful. On the other hand, the solution may be acidic, i. e., one containing sulfuric, nitric, acetic or hydrochloric acids, for example. In general, as to acidic liquors, the same considerations and objections apply to the presence of iron or aluminum, as in ammoniacal solutions.

More frequently, the source material is a mixture of solids. It may be an ore, a mineral concentrate, a residue of some mineral dressing or metallurgical process, a matte or speiss, a scrap metal or some other partially-refined product or by-product. In such case the first problem is to get the metals of interest into solution. This is done by leaching in some suitable manner, usually after converting the feed to particulate form if it is not already in that state. Leaching liquors may be acidic or basic, according to desire or necessity. In any case, this leaching step per se is not a function of the present invention. The leaching circuit may be varied in known ways to meet the requirements imposed by the nature of the feed.

In any case, after leaching the operator is in possession of a solution containing the metals of interest in some form. Unfortunately, in many cases resultant leach liquor will be more dilute as to the metal or metals of interest than is generally desirable. Unfortunately too, most such leaching schedules, while resulting in extraction of the metal or metals of interest to the desired degree, also result in the extraction of iron and/or aluminum as well. Particularly is this true of leaching in strongly acidic circuits, i. e., those having a hydrogen ion content greater than that at about a pH of 2.5. Even ferric iron is quite soluble under such highly acidic conditions.

Whether obtained as the initial source material or by leaching, the solution is treated with a suitable neutralizing agent to produce a pH of from about two to about six. This pH adjustment results in substantially complete precipitation of the metal or metals of interest as basic oxides or other basic compounds. Ferric iron and aluminum also precipitate.

If the solution is originally basic, it may be treated with an acid, usually a mineral acid. However, care should be taken not to produce acid-insoluble salts of a metal of interest. For example, sulfuric acid should not be used to neutralize ammoniacal liquors if lead is ultimately to be recovered after the releaching. Excessively acidic liquors may be partially neutralized with any available base. In many cases lime or magnesia will be available from concurrent operation of other processes. If so, it ordinarily may be used. Where insoluble calcium or magnesium salts will produce a problem, sodium or potassium hydroxides may be used but ammonia will generally be preferable.

The temperature at which such precipitation of the oxides or basic compounds by pH adjustment is accomplished is done is not particularly critical. However, lower temperatures are preferable. In practice, neither heating nor cooling ordinarily need be provided since the liquors will usually be below about 350°–325° F. In this range, precipitation is usually adequately complete.

Precipitation being accomplished, resultant liquor and solids are separated. This may be done in any desired manner, as by decantation, filtration or their mechanical equivalents. Washing is usually not necessary but may be desirable. For example, if precipitation is from ammoniacal liquors, sufficient freedom from entrapped ammonia is desirable.

In some cases, it may be desired to scavenge the mother liquor to recover any residual dissolved metals. However, the mother and/or wash liquors usually are recycled. If so, substantially all the metals values eventually are recovered. In some cases, quite an appreciable amount of metal salt may remain in solution, depending on the nature of the metal and the acid. If so, a separate recovery step may be used before recycling the solution. This is more fully discussed below.

Resultant collected solids are then treated in the second positive operation of this invention. They are placed in a suitable pressure vessel and subjected to an acid leaching at relatively high temperature. In the present discussion this step is referred to as the "reautoclaving" step even though in the cases where the initial feed is a solution, an actual "leaching" step is by-passed.

In this reautoclaving step, both temperature and acidity should be considered. As to temperature, in sulfate liquors at below a pH of about two, ferric iron is soluble to less than about twenty grams per liter at about 350° F., but less than about 3.9 g./l. at above about 450° F. In general, however, aluminum rejection requires a somewhat higher temperature range. Above about 400° F. is desirable and some 450°–500° F. or higher is preferable for rejection of aluminum. Higher temperature of course may be used. The actual limit is about the temperature at which the autogenous pressure approaches the pressure limitation of the apparatus. Ordinarily, however, temperatures above about 500°–525° F. are seldom used for reasons of economy.

As to the acid strength to be employed during reautoclaving, the solution should not be used at a pH of above about 2.0–2.5. In fact, oxides of some of metals of interest, for example, tin, thorium, zirconium and the like, tend to precipitate at pH above about 2.0. For such metals, a pH below about 1.0 should be maintained. In any case, a pH below 1 is the preferred general practice wherever it is practicable. The upper limit on the strength of acid is not critical. However, since the resultant solution is subsequently neutralized, the use of acid in excessive amounts should be avoided.

As to the nature of the acid used in reautoclaving, there is considerable latitude. Sulfuric will be most commonly encountered in actual practice. This is due to the prevalence of sulfide ores and the known practice of oxidation-leaching thereof. Such leaching results in sulfate liquors, and will constitute one of the most common sources of solutions treated according to the present invention. Again, of course, in the case of some elements such as lead or tin, sulfate solutions cannot be used. Nitric acid is preferred in the case of lead. However, similar phenomena of low solubility of iron, resulting in 90– 97% or better iron rejection, and of aluminum, resulting in 80% or better aluminum rejection has been observed for iron and aluminum salts in liquors of other acids. Nickel, cobalt, copper, cadmium, chromium, zinc, lead and other metals are suitably soluble at these conditions in nitric, acetic and often hydrochloric acids, depending on the aqueous solubility of the particular metal salt.

Use of oxidizing conditions during the reautoclaving step ordinarily is not considered essential. However, it is highly desirable to insure that all of the iron is in the ferric condition during this operation. Therefore, it is helpful if during reautoclaving there is available some material of oxidizing capacity such as oxygen or some equivalent.

The present invention will be more fully described in conjunction with the following examples which are intended as illustrative only. All parts are by weight except as otherwise noted.

Example 1

An industrial hydrometallurgical residue containing small amounts of copper, nickel, cobalt, ferric oxide, alumina and silicious gangue is leached at 450–475° F. with about 7% aqueous sulfuric acid in an autoclave at about 550 p. s. i. g. under a partial pressure of about 20 p. s. i. g. of oxygen, for approximately two hours with the following result:

| Original Assay (weight percent) | | Solution Content (gm./l.) | Extraction (weight percent) |
|---|---|---|---|
| Co | 2.8 | 10.8 | 99 |
| Ni | 4.1 | 14.0 | 97 |
| Cu | 0.9 | 3.4 | 86 |
| $Fe_2O_3$ | 3.3 | 0.3 | 3 |
| $Al_2O_3$ | 8.2 | 1.9 | 9 |

Leach solution is neutralized to about pH 6 with lime and resultant solids removed by filtration, leaving a clarified liquor containing substantially all the nickel and cobalt and only traces of dissolved iron and aluminum, the dried filter cake residue assaying (weight percent) about Cu—15, $Fe_2O_3$—1.4 and $Al_2O_3$—10. Separated solids from a number of such runs is accumulated and releached with about 10% aqueous sulfuric acid at about 450° F., giving a leach liquor containing about 45 g./l. of copper, 0.04 g./l. of $Fe_2O_3$ and 2.5 g./l. of $Al_2O_3$.

Example 2

In order to show the capacity of the present process to concentrate the non-ferrous metals from iron in a feed high in iron and low in copper, Example 1 is repeated on a different industrial nickel- and cobalt-bearing by-product mixture, with the following results

| Original Assay (weight percent) | | Solution Content (gm./l.) | Extraction (weight percent) |
|---|---|---|---|
| Cu | 0.1 | 0.3 | 45 |
| Co | 0.4 | 0.6 | 85 |
| Ni | 6.46 | 13.5 | 90 |
| $Fe_2O_3$ | 46.5 | 2.8 | 4 |
| $Al_2O_3$ | 5.25 | 0.4 | 4 |

Solution obtained by reautoclaving the solids residues obtained by partial neutralization and filtration contains (g./l.) Cu—7.6, $Fe_2O_3$—2.9 and $Al_2O_3$—0.26, an increase in $Cu/Fe_2O_3$ ratio over the original of some 2400 times. A repetition of the neutralizing, solids collecting and reautoclaving steps is carried out for purposes of comparison. It produces solution containing (g./l.) Cu—68, $Fe_2O_3$—0.9 and $Al_2O_3$—less than 0.1.

Example 3

A sample (2400 parts) of low-grade metallurgical tailing sludge (22% $H_2O$) is slurried with 345 ml. of concentrated $H_2SO_4$ and water to about 15% solids and leached in an autoclave at about 450° F. under a positive partial pressure of oxygen for about one hour and resultant slurry is pressure-relieved, cooled, filtered and the solids discarded to obtain 2.39 liters of solution. The results are shown below:

| Original Assay (weight percent) | Solution Content (gm./l.) | Extraction (weight percent) |
|---|---|---|
| Cu | 0.9 | 4.4 | 80.0 |
| Co | 2.0 | 11.4 | 94.0 |
| Ni | 4.1 | 23.8 | 95.9 |
| $U_3O_8$ | .25 | 0.4 | 95.3 |
| $Fe_2O_3$ | 3.3 | 0.7 | 10.0 |
| $Al_2O_3$ | 8.2 | 3.5 | 11.4 |

Filtrate is neutralized to about pH 5.3–6.0 with lime and magnesia, leaving a cobalt and nickel bearing solution substantially free of the other constituents. Resultant solids is too high in Fe and Al for a satisfactory uranium concentrate. Collected impure solids is re-autoclaved at about 450°–475° F. under otherwise similar conditions and again pressure-relieved, cooled and filtered. Filter cake is recycled with additional feed mixture in subsequent cycles. Filtrate is neutralized to about pH 2.0–2.3 with magnesia and $(NH_4)_2HPO_4 \cdot H_2O$ is added in molar excess of the dissolved uranium. Uranium phosphate is precipitated in better than 85% recovery based on the original feed solids, leaving a substantially iron-free solution containing substantially all the copper.

One further modification of the potentialities of the process should be noted. For example, a feed solids mixture, such as a lateritic ore residue, may often contain iron and/or aluminum, copper and/or chromium, and one or more metals such as nickel or cobalt. After an acidic-leaching at above 350° F. and a pH of 2.0 or less, the solution will contain some of each of these metals. After an acidic oxidation the leach liquor will contain some 90%–98% of the nickel, cobalt and copper; and about 5–15% of the chrome as well as the dissolved iron and aluminum.

When using sulfuric acid liquors, the succeeding step of pH adjustment to about pH 2–6 will precipitate substantially all of the iron, aluminum, chromium and copper. However, much of the nickel and/or cobalt will remain in solution. After solids removal, residual liquor is in excellent condition for nickel or cobalt recovery. Such nickel and/or cobalt separation and recovery is definitely part of the present invention.

After reautoclaving such a precipitate according to the present process, substantially all of the copper and chromium together with any nickel and/or cobalt in the precipitate will be found to have redissolved. A very low iron and/or aluminum content is found in resultant reautoclave liquor. If the reautoclave liquor is first separated from residual iron- and/or aluminum-bearing solids and is then again subjected to a pH adjustment to from about 2.0 to about 6.0, preferably above at least 2.5, the copper and any chromium present will substantially wholly precipitate. If this latter precipitate is collected, it will be found an excellent concentrate of these metals from which either or both can be readily recovered. This method of concentrating copper together with any chromium or other metals which exhibit oxide-solubility phenomena similar thereto is also definitely contemplated as a step in the process of the present invention.

From the foregoing discussion it will be seen that the present invention has provided a procedure for concentrating a wide variety of acid-soluble non-ferrous metals from admixtures containing excessive amounts of diluent iron and/or aluminum. It can be utilized to eliminate iron and/or aluminum from mixtures with substantially any non-ferrous metal that forms soluble compounds in aqueous solutions of a suitable acid at a strength greater than equivalent to a pH of about one or two.

In summation the steps are simple. If the feed is a mixture of solids, it is acid leached by known methods at about 350° F. in the presence of sufficient oxygen to insure the dissolved iron being in the ferric state. The acid content is maintained above that equivalent to about pH 2. If the feed is a solution, it should be treated as necessary in some known manner to insure an acid content of about pH 2, or higher, that the dissolved iron is in the ferric condition.

Resultant solution is then treated at ambient temperatures to produce a pH between about two and about six. This results in the precipitation of substantially all the dissolved iron and aluminum. Some non-ferrous metals remain in solution, some precipitate with the iron and/or aluminum. There is a rough correlation between the solubility product at room temperature of the hydroxide of certain non-ferrous metal ions and the pH range in which the oxide or hydroxide has been found to precipitate. This may be illustrated for example by the following table in which both the correlation and the inconsistencies of certain metals such as titanium may be seen.

| Ion | Approximate Solubility Product (room temp.) | Approximate pH at which hydroxide precipitation is initiated |
|---|---|---|
| $Ti^{++++}$ | $1 \times 10^{-29}$ | 1–2 |
| $Th^{++++}$ | $1 \times 10^{-29}$ | 1–2 |
| $Fe^{+++}$ | $4.1 \times 10^{-38}$ | 2–3 |
| $Al^{++}$ | $1.9 \times 10^{-33}$ | 3–5 |
| $Cu^{++}$ | $5.6 \times 10^{-20}$ | 3.5–6 |
| $UO_2^{++}$ | $3 \times 10^{-22}$ | 4–6 |
| $Zn^{++}$ | $4.5 \times 10^{-17}$ | 6 |
| $Pb^{++}$ | $2.8 \times 10^{-16}$ | 7 |
| $Fe^{++}$ | $1.7 \times 10^{-15}$ | 7 |
| $Co^{++}$ | $2 \times 10^{-16}$ | 7–8 |
| $Ni^{++}$ | $1.6 \times 10^{-14}$ | 7 |
| $Mn^{++}$ | $7 \times 10^{-15}$ | 8–9 |
| $Mg^{++}$ | $5.5 \times 10^{-12}$ | 9–11 |
| $Ca^{++}$ | $8 \times 10^{-6}$ | 10–12 |

In general, those metals such as copper and zinc having a solubility product less than about that of lead tend to precipitate with the iron and aluminum during the pH adjustment. Such metals can be thereby substantially separated from metals such as cobalt, nickel, manganese and the like which, having a greater solubility product tend to remain in solution. If this result is desired, more precise pH control can be used to retain certain desired metals in solution. For example, carefully controlling the pH at from about one to about three will reject substantially all the iron and aluminum but retain much of the copper.

However, it also may be found a desirable practice to precipitate everything that precipitates at pH values up to about six. The resultant precipitate is then reautoclaved using an acid strength greater than that at about pH 1 and temperatures above about 350° F. when iron is to be rejected and 400° F. when aluminum is to be rejected. This results in redissolving substantially all the non-ferrous metal content of the precipitate but only 10% or less of the iron and 15% or less of the aluminum, depending principally upon the reautoclaving temperature used. This, as has been shown, results in a liquor having a ratio of non-ferrous metal to iron and/or aluminum many times greater than the original. Then, if so desired, this solution can be carefully neutralized to precipitate dissolved iron and aluminum while retaining those metals having a substantially smaller solubility product. If so desired, the neutralization, solids collecting and releaching steps can be repeated.

We claim:
1. In acid-leaching non-ferrous metal values from a solids mixture containing (a) at least one diluent metal selected from the group consisting of iron and aluminum and (b) metal values of at least one non-ferrous metal which is substantially insoluble in the leaching acid at a pH between about two and about six, by heating a slurry of said solids mixture in an aqueous mineral acid leaching-liquor, said leaching-liquor having an acid content at least equivalent to that at pH 2, to an elevated temperature under superatmospheric pressure and treating said heated slurry with an oxygen-containing gas while maintaining said elevated temperature, superatmospheric pressure and acid content, whereby said metal values and diluent metal are dissolved; the improvement in selectively concentrating said metal values which comprises: maintaining said elevated temperature above at least about 350° F. until dissolution of said non-ferrous metal substantially ceases, whereby non-ferrous metal is selectively dissolved; separating resultant solution from residual solids; adjusting the pH of so-separated solution to from about two to about six, whereby dissolved non-ferrous and diluent metals are precipitated as a mixture wherein the ratio of said non-ferrous metal to diluent metal is increased over that in said solids mixture; collecting said precipitate; forming a second slurry of collected precipitate in an aqueous mineral acid treating-liquor having an acid content in excess of that at pH 2; heating said second slurry to a temperature above 350° F. when aluminum rejection is not required and above about 400° F. when aluminum is to be rejected, maintaining said second slurry at said temperature and acid content until dissolution of non-ferrous metal substantially ceases and removing residual solids, whereby a solution is obtained wherein the ratio of dissolved metal value to diluent-metal is higher than in said precipitate.

2. A process according to claim 1 in which said solids mixture also contains additional metal values in at least one acid-soluble, non-ferrous metal which forms with said leaching acid a salt appreciably soluble at a pH from about two to about six, whereby said additional metal values remains in solution after said pH adjustment.

3. A process according to claim 2 in which said additional metal values include at least one metal selected from the group consisting of cobalt and nickel.

4. A process according to claim 1 in which at least part of both said separated solutions are combined and treated to recover non-ferrous metal values.

5. A process according to claim 1 in which said non-ferrous metal values insoluble in acid at pH 2–6, comprise at least one metal selected from copper and chromium.

6. A process according to claim 4 in which the second collected solids-free liquor is adjusted at pH above about two but below about six, whereby any dissolved copper and chromium is precipitated.

References Cited in the file of this patent

UNITED STATES PATENTS

| | | |
|---|---|---|
| 2,662,009 | Roberts et al. | Dec. 8, 1953 |
| 2,686,114 | McGauley et al. | Aug. 10, 1954 |
| 2,722,480 | Roy | Nov. 1, 1955 |
| 2,746,856 | Mancke | May 22, 1956 |
| 2,746,859 | McGauley et al. | May 22, 1956 |